(12) United States Patent
Saika et al.

(10) Patent No.: US 7,650,393 B2
(45) Date of Patent: Jan. 19, 2010

(54) INFORMATION PROCESSING SYSTEM AND METHOD

(75) Inventors: Nobuyuki Saika, Yokosuka (JP); Atsushi Murakami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 966 days.

(21) Appl. No.: 11/113,045

(22) Filed: Apr. 25, 2005

(65) Prior Publication Data
US 2006/0206588 A1 Sep. 14, 2006

(30) Foreign Application Priority Data
Mar. 10, 2005 (JP) .............................. 2005-066908

(51) Int. Cl.
*G06F 15/16* (2006.01)
(52) U.S. Cl. ...................... 709/219; 709/228; 340/825; 710/104; 713/1
(58) Field of Classification Search ................. 709/219, 709/228; 340/825; 710/104; 713/1
See application file for complete search history.

(56) References Cited

U.S. PATENT DOCUMENTS

| 5,031,089 | A | * | 7/1991 | Liu et al. ..................... 709/226 |
| 5,860,137 | A | * | 1/1999 | Raz et al. ..................... 711/202 |
| 6,006,259 | A | * | 12/1999 | Adelman et al. ............. 709/223 |
| 6,275,953 | B1 | * | 8/2001 | Vahalia et al. ................. 714/11 |
| 6,282,201 | B1 | * | 8/2001 | Alexander et al. .......... 370/401 |
| 6,389,448 | B1 | * | 5/2002 | Primak et al. ............... 718/105 |
| 6,418,517 | B1 | * | 7/2002 | McKenney et al. ......... 711/151 |
| 6,438,652 | B1 | * | 8/2002 | Jordan et al. ................ 711/120 |
| 6,691,175 | B1 | * | 2/2004 | Lodrige et al. .............. 719/314 |
| 7,020,796 | B1 | * | 3/2006 | Ennis et al. ..................... 714/4 |
| 7,299,468 | B2 | * | 11/2007 | Casey et al. ................. 718/104 |
| 7,328,237 | B1 | * | 2/2008 | Thubert et al. .............. 709/203 |
| 7,356,531 | B1 | * | 4/2008 | Popelka et al. ................. 707/8 |
| 7,430,167 | B2 | * | 9/2008 | Glaise et al. ................ 370/229 |
| 2004/0071087 | A1 | * | 4/2004 | Siev et al. .................... 370/235 |

(Continued)

FOREIGN PATENT DOCUMENTS

JP 2002-140202 5/2002

OTHER PUBLICATIONS

Lassettre, Edwin R. et al. HotRod: An Autonomic System for Dynamic Surge Protection. IBM Research Report [online], Mar. 17, 2003 [retrieved on Jan. 16, 2009]. Retrieved from the Internet: <URL: http://domino.watson.ibm.com/library/cyberdig.nsf/papers/485BF8B1F6EF56FD85256CEE0064CD4F/$File/RC22743.pdf>.*

*Primary Examiner*—Thuha T. Nguyen
*Assistant Examiner*—Eric W Shepperd
(74) *Attorney, Agent, or Firm*—Antonelli, Terry, Stout & Kraus, LLP.

(57) ABSTRACT

Loads on access destinations are balanced. A first controller and a second controller, which accept requests from a plurality of sources, and write and read data to/from a storage device in response to these requests, are provided. The first controller returns to at least one first source of a plurality of sources a response to a request from the first source, and does not return to a second source other than a first source a response to a request from the second source. The second controller does not return a response to a request from a first source to the first source receiving a response from the first controller, and returns a response from a second source to the second source not receiving a response from the first controller.

16 Claims, 9 Drawing Sheets

U.S. PATENT DOCUMENTS

| | | | |
|---|---|---|---|
| 2004/0078419 A1* | 4/2004 | Ferrari et al. | 709/201 |
| 2004/0267758 A1* | 12/2004 | Katsurashima | 707/10 |
| 2004/0267930 A1* | 12/2004 | Giulio et al. | 709/225 |
| 2005/0144280 A1* | 6/2005 | Kawai et al. | 709/225 |
| 2005/0198401 A1* | 9/2005 | Chron et al. | 709/250 |
| 2005/0223096 A1* | 10/2005 | Shinkai | 709/225 |
| 2005/0267929 A1* | 12/2005 | Kitamura | 709/201 |
| 2006/0029097 A1* | 2/2006 | McGee et al. | 370/468 |
| 2006/0129695 A1* | 6/2006 | Faibish et al. | 709/245 |
| 2006/0233155 A1* | 10/2006 | Srivastava | 370/351 |
| 2007/0094373 A1* | 4/2007 | Brendel | 709/223 |

* cited by examiner

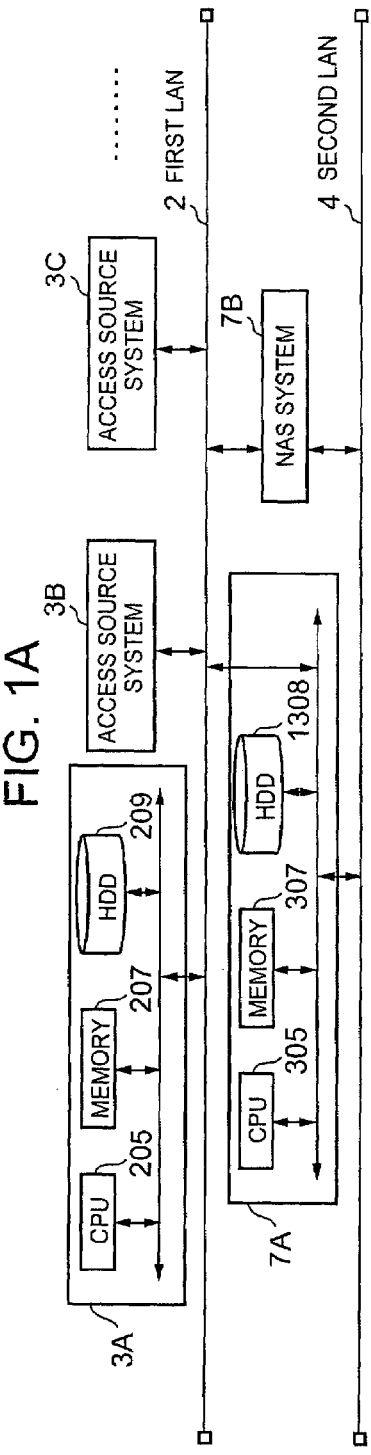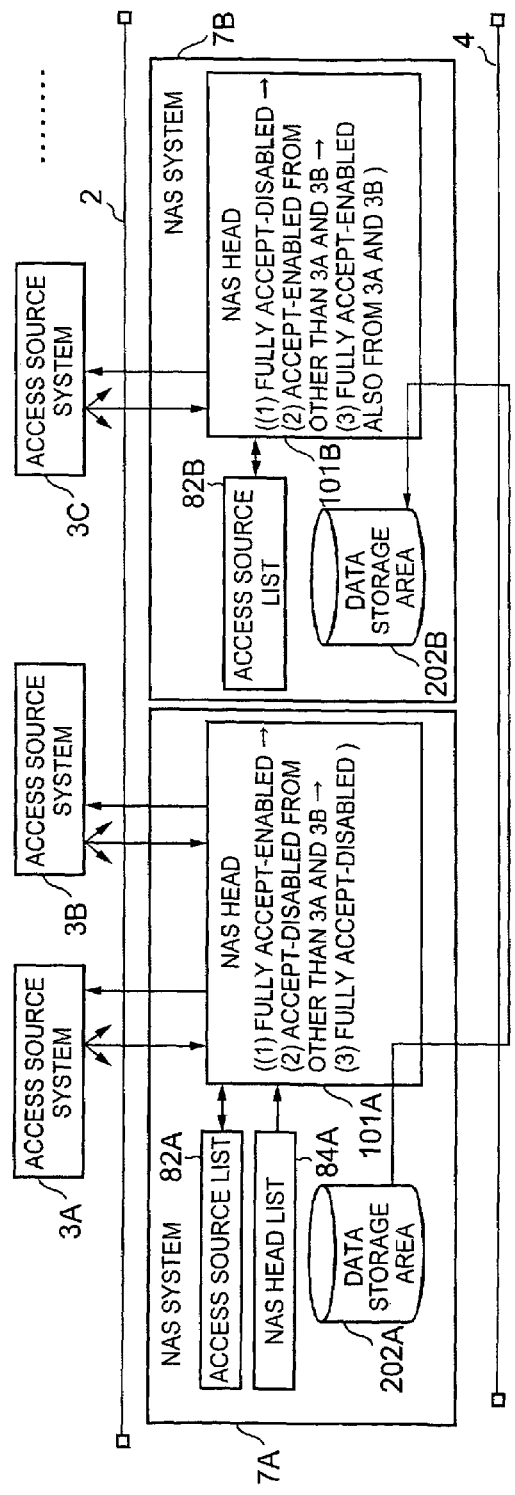

FIG. 3A

AP MANAGED NAS HEAD LIST

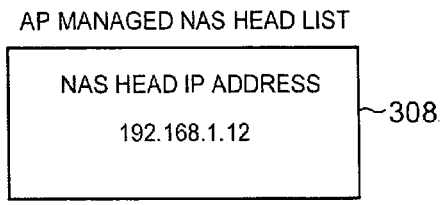

FIG. 3B

OS MANAGED NAS HEAD LIST

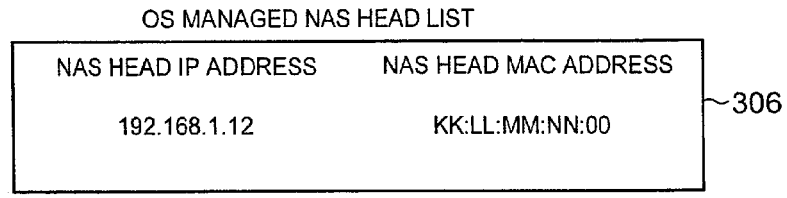

FIG. 3C

ARP RESPONSE CONTROL TABLE (PERMIT RESPONSE SPECIFIED)   31A

| ACCESS SOURCE IP ADDRESS 1 | DESTINATION INTERFACE 1 | RESPONSE- ENABLED |
|---|---|---|
| ACCESS SOURCE IP ADDRESS 2 | DESTINATION INTERFACE 2 | RESPONSE- ENABLED |
| ... | ... | ... |
| ACCESS SOURCE IP ADDRESS N | DESTINATION INTERFACE N | RESPONSE- ENABLED |
| OTHER THAN ABOVE | | RESPONSE-DISABLED |

FIG. 3D

ARP RESPONSE CONTROL TABLE (PERMIT RESPONSE SPECIFIED)   31B

| ACCESS SOURCE IP ADDRESS 1 | DESTINATION INTERFACE 1 | RESPONSE- DISABLED |
|---|---|---|
| ACCESS SOURCE IP ADDRESS 2 | DESTINATION INTERFACE 2 | RESPONSE- DISABLED |
| ... | ... | ... |
| ACCESS SOURCE IP ADDRESS N | DESTINATION INTERFACE N | RESPONSE- DISABLED |
| OTHER THAN ABOVE | | RESPONSE-ENABLED |

FIG. 4A

CURRENTLY ACCESSED ACCESS SOURCE LIST

| ACCESS SOURCE IP ADDRESS 1 | AMOUNT OF SENT DATA 1 | AMOUNT OF DATA SENT PER UNIT TIME 1 | ~11 |
|---|---|---|---|
| ACCESS SOURCE IP ADDRESS 2 | AMOUNT OF SENT DATA 2 | AMOUNT OF DATA SENT PER UNIT TIME 2 | |
| ... | ... | ... | |

FIG. 4B

CUMULATIVE ACCESS SOURCE LIST

| ACCESS SOURCE IP ADDRESS 1 | ~33 |
|---|---|
| ACCESS SOURCE IP ADDRESS 2 | |
| ... | |

FIG. 4C

ALTERNATE CANDIDATE NAS HEAD LIST

| NAS HEAD IP ADDRESS 1 | ~13 |
|---|---|
| NAS HEAD IP ADDRESS 2 | |
| ... | |

INFORMATION PROCESSING SYSTEM AND METHOD

CROSS-REFERENCE TO PRIOR APPLICATION

This actual position relates to and claims priority from Japan Patent Application No. 2005-066908, filed on Mar. 10, 2005, the entire disclosure of which is incorporated herein by reference.

BACKGROUND OF THE INVENTION

For example, conventional technology for load balancing is disclosed in Japanese Patent Application Laid-open No. 2002-140202. According to this technology, a web server operates with a plurality of virtual computers created within a physical machine and a load balancing device between a web server and a plurality of web clients receives information from the plurality of web clients, and allocates processing of the received information to one of the plurality of virtual computers.

However, according to the afore-mentioned technology, when a large number of web clients exist, information from this large number of web clients is received with a single load-balancing device. In other words, the access destination of the large number of web clients is a single load-balancing device. Thus, load is concentrated in the load-balancing device, forming a bottleneck.

An object of the present invention is, therefore, the balancing of the load applied to the access destination.

Further objects of the present invention will be clarified from the following description.

SUMMARY OF THE INVENTION

The information processing system according to the first aspect of the present invention has a first controller and a second controller accepting requests from a plurality of sources, and writing and reading data to/from a storage device in response to these requests. The first controller returns a response to a request from at least one first source of the plurality of sources, to the first source, and does not return a response to a request from a second source other than the first source, to the second source. The second controller does not return a response to a request from the first source to the first source receiving a response from the first controller, and returns a response from the second source to the second source not receiving a response from the first controller.

Here, the controllers can be, for example, NAS heads as described below. In this case, the information processing system can also be, for example, a NAS head system.

Furthermore, the information processing system can also have the storage device. In this case, for example, the information processing system can be comprised of a single NAS system, or a plurality of NAS systems.

In one embodiment, the first controller can have a first logical address and a first physical address. The second controller can have a second logical address and a second physical address. The first logical address and the second logical address can be the same logical address indicating the same value. When the first controller receives a request including the same logical address from the first source, the response including the first physical address can be returned to the first source. When the second controller receives a request including the same logical address from the second source, a response including the second physical address can be returned to the second source.

In one embodiment, the request can be an ARP request including an IP address. The response can be an ARP response including a MAC address.

In one embodiment, the first controller can send an addition request and a first source ID identifying the first source to the second controller. The second controller receives the addition request and afore-mentioned first source ID, responds to the addition request, and by setting the first source ID such that the response thereto is refused, can prevent response to the request from the first source.

In one embodiment, the second controller, furthermore, sets source IDs other than the first source ID such that the response thereto is permitted, and thus can send a response to the request from the source having the second source ID.

In one embodiment, the first controller evaluates whether or not the load on the first controller is equal to or greater than the first size, and if the result of the evaluation is affirmative, can send the addition request to the second controller.

In one embodiment, the first controller can issue an inquiry to the second controller as to whether or not addition is possible. If the load on the second controller is equal to or less than the prescribed size, the second controller can issue a response to the first controller to the effect that addition is possible. When the first controller receives a response from the second controller to the effect that addition is possible, the addition request can be issued to the second controller.

In one embodiment, at least one of the first controller and afore-mentioned second controller can execute processing to enable data accessible by the first source via the first controller to be accessible by the second source via the second controller. Here, this processing can, for example, share this data (for example, share the logical volume storing the data), or processing can be employed to copy from the first storage area accessible by the first controller but not accessible by the second controller to the second storage area accessible by the second controller.

In one embodiment, a plurality of controllers including the first controller but not including the second controller, may be used. Each of the plurality of controllers writes to the prescribed storage area the source ID to which the each controller can respond, and thus all source IDs to which the plurality of controllers can respond are recorded in the prescribed storage area. The first controller can send all source IDs recorded in the prescribed storage area to the second controller. The second controller can set all the received source IDs such that the response thereto is refused, and thus a response is not sent to any of the sources corresponding to the source IDs.

In one embodiment, the first controller can send a succession request and first ID to identify the first source to the second controller. When the second controller receives the succession request and the first source ID, it responds to the succession request, and sets the first source ID such that the response thereto is permitted, and thus a response can be returned also to requests from the first source.

In one embodiment, when the first controller no longer responds to requests from any source, the succession request can be issued.

In one embodiment, the first controller evaluates whether or not the load on the first controller is equal to or less than the second size, and if the result of the evaluation is affirmative, can send the succession request to the second controller.

In one embodiment, the first controller can issue an inquiry to the second controller as to whether or not succession is possible. If the load on the second controller is equal to or less than the prescribed size, the second controller can issue a response to the first controller to the effect that succession is possible. When the first controller receives a response from the second controller to the effect that succession is possible, the succession request can be issued to the second controller.

In one embodiment, when the first controller does not receive a response to the effect that the succession is possible, source IDs other than the first source ID are also set such that the response thereto is permitted, and thus can return a response even to requests from other than the first source.

In one embodiment, at least one of the first controller and afore-mentioned second controller can delete first data when the first data accessible by the first source via the first controller, and second data accessible via the second controller, are the same.

The information processing method according to the second aspect of the present invention has a step in which a first controller and a second controller receive a plurality of requests respectively from a plurality of sources, a step in which the first controller returns a response to a request from at least one first source of the plurality of first sources, to the first source, and does not return a response to a request from a second source other than the first source, to the second source, and a step in which the second controller does not return a response to a request from the first source to the first source receiving a response from the first controller, and returns a response from the second source to the second source not receiving a response from the first controller.

The information processing system according to the third aspect of the present invention has a plurality of controllers accepting requests from a plurality of request sources, and writing and reading data to/from the storage device in response to requests. Each of the plurality of controllers has a first address which is the same for the plurality of the controllers and a second address which is different for each controller. The plurality of controllers accept requests issued with the first address from the request source. One of the plurality of controllers sends a response including the second address to the request source.

In one embodiment, the controller which has sent a response including the second address to the request source can send to another controller an addition request and a first source ID identifying the request source to which the response has been sent. The other controller is able to not respond to requests from the request source identified by the first source ID in response to the addition request.

In one embodiment, the controller which has sent a response including the second address to the request source can send to another controller an addition request and a first source ID identifying the request source to which the response has been sent. The other controller is able to respond to requests from the request source other than those identified by the first source ID in response to the addition request.

The various elements comprising the afore-mentioned controller can be constructed using, for example, a computer program, however, they can also be constructed using a combination of hardware and a computer program. The computer program is loaded into, and executed on, the prescribed processor. Furthermore, when loading the computer program into the processor to process information, a storage area existing in hardware resources such as memory and the like may be used appropriately.

BRIEF DESCRIPTION OF THE DRAWINGS

FIG. 1A shows an outline of the hardware configuration of the system according to one embodiment of the present invention;

FIG. 1B shows an outline of processing conducted in the system according to one embodiment of the present invention;

FIG. 3A shows an example of the configuration of the AP managed NAS head list;

FIG. 3B shows an example of the configuration of the OS referenced NAS head list;

FIG. 3C shows an example of the configuration of the first ARP response control table;

FIG. 3D shows an example of the configuration of the second ARP response control table;

FIG. 4A shows an example of the configuration of the currently accessed access source list;

FIG. 4B shows an example of the configuration of the cumulative access source list;

FIG. 4C shows an example of the configuration of the alternate candidate NAS head list;

DESCRIPTION OF THE PREFERRED EMBODIMENTS

Figure 2:
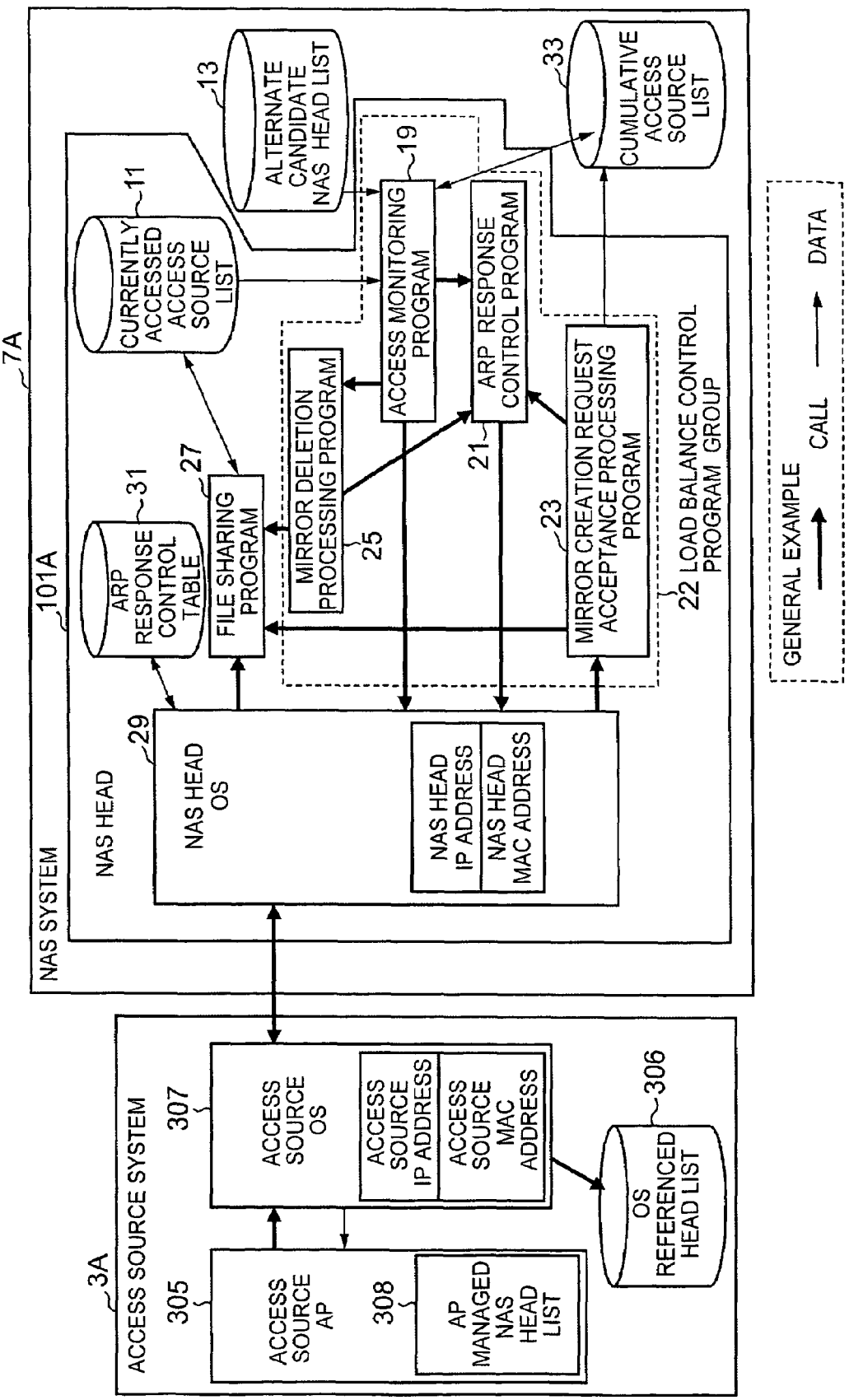
FIG. 2 shows an outline of the software configuration of the system according to one embodiment of the present invention.

The information processing system according to one embodiment of the present invention can, for example, be implemented with one or a plurality of NAS systems. One embodiment of the present invention is described below using a system including one or a plurality of NAS systems as an example.

FIG. 1A shows an outline of the hardware configuration of the system according to one embodiment of the present invention.

A plurality of access source systems 3A, 3B, 3C, . . . , and one or a plurality (for example, two) of NAS (Network Attached Storage) systems 7A and 7B are connected to the first LAN (Local Area Network) 2. Furthermore, the plurality of access source systems 3A, 3B, 3C, . . . are not connected, however, the plurality of NAS systems 7A and 7B are also connected to the second LAN 4. Communications between each of the plurality of access source systems 3A, 3B, 3C, . . . , and each of the plurality of NAS systems 7A and 7B, is via the first LAN 2, however, communications between the NAS systems 7A and 7B can be via the second LAN 4.

Since the plurality of access source systems 3A, 3B, 3C, . . . can all employ the same configuration in practice, the access source system 3A is employed as a representative example in the description. The access source system 3A is, for example, a computer system having hardware resources such as one or more CPUs (Central Processing Units) 205, and storage resources (for example, one or more memories 207, and/or one or more hard disk drives (HDD) 209) and the like. The access source system 3A can, for example, be comprised of a personal computer, a workstation, or a main frame computer and the like. Furthermore, the access source system 3A can, for example, also be a server (for example, a web server) accessed from a client machine (for example, a personal computer) via a communications network such as the Internet. The access source system 3A can also have, for example, information entry devices such as a keyboard switch and pointing device, and a microphone (not shown in drawings) and the like, and information output devices, such as a monitor display and speaker (not shown in drawings) and the like.

Since the NAS systems 7A and 7B can both employ the same configuration in practice, the NAS system 7A is employed as a representative example in the description. The NAS system 7A has hardware such as one or more CPUs 305, and storage resources (for example, one or more memories 307, and or one or more HDDs 1308) and the like. The NAS systems 7A and 7B (in practice, the NAS heads described below) can have a first IP address used for communication between the access source systems 3A, 3B, and 3C, and a second IP address used for communication between NAS systems. The first IP address can be the same for all NAS heads, and the second IP address can be different for each NAS head. In other words, each access source system specifies and issues the same IP address (described in detail below in reference to FIG. 9) whichever NAS head the request is issued to. Furthermore, when each NAS head communicates with another NAS head via the second LAN 4, the second IP address of this other NAS head can be specified for communication.

The outline of the hardware configuration according to the present embodiment has been described above. A logical volume may be provided in the physical storage area having one or more HDDs 1308. Furthermore, at least one memory 307 may have a cache memory for temporary storage of data transferred between the access source system 3A and the logical volume.

In the afore-mentioned hardware configuration, for example, the access source system 3A issues an access request being a data write request or a data read request to the NAS system 7A or 7B, and the NAS system 7A or 7B receiving this access request can process this access request. In practice, when, for example, the access request is a data write request, the CPU in the NAS system 7A or 7B can write data to the cache memory from the access source system 3A in accordance with the write request, and can read the data written to the cache memory and write it to the logical volume. Furthermore, for example, when the access request is a data read request, the CPU in the NAS system 7A or 7B can read data from the logical volume in accordance with the read request, write it to the cache memory, read it from the cache memory, and send it to the access source system being the source of the read request.

For example, the following processing can be conducted in the system according to the present embodiment. In this embodiment, the access request may be a read request or a write request, however a read request is considered more effective. The following description of the processing conducted in the system according to this embodiment assumes that the access request issued from the access source system is a read request.

FIG. 1B is a diagram describing the outline of processing conducted in the system according to one embodiment of the present invention.

Each access source system 3A, 3B, and 3C issues inquiries. If the NAS head described below receiving the issued inquiry is able to accept the read request (hereafter referred to as 'accept-enabled'), a response is returned to the access source system 3A being the source of the inquiry. By parsing the response, the access source system 3A identifies the accept-enabled NAS head. The ARP (Address Resolution Protocol) request can be employed as the inquiry. An IP address is included in the ARP request. The ARP response can be employed as the response for the ARP request. The ARP response includes the MAC (Media Access Control Address) of the device to which the IP address included in the ARP request is allocated. Each access source system 3A, 3B, and 3C issues a read request to the NAS head having the MAC address included in the ARP response. In other words, in this embodiment, the NAS head receives the ARP request and returns an ARP response for that ARP request, implying that this NAS head may accept a read request from the ARP request source.

The NAS system 7A has, for example, the data storage area 202A, the access source list 82A, the NAS head list 84A, and the NAS head 101A.

The data storage area 202A is a storage area in which data read with a read request from the access source system is stored, and is, for example, a cache memory or a logical volume and the like.

The access source list 82A is data stored in the storage resource of the NAS system 7A, and the access source ID (for example, the IP address and/or the MAC address) being the ID of the access source system is recorded. At least one of the ID of the access source system which may accept the read request (hereafter referred to as the 'OK access source ID'), and the ID of the access source system which must not accept the read request (hereafter referred to as the 'NG access source ID'), can be recorded in the access source list 82A.

The NAS head list 84A is data stored in the storage resource of the NAS system 7A, and the NAS head ID (for example, the IP address and/or the MAC address) being the ID of the NAS head is recorded. The NAS head ID recorded in this NAS head list 84A is, for example, the ID of a NAS head candidate which can be accept-enabled.

The NAS head 101A can control a variety of processing, for example, writing of data to the data storage area 202A. The NAS head 101A may be a circuit board on which a CPU and memory are mounted, or may be a virtual computer to which part of the hardware such as a CPU (for example, part of its usage) and the like is allocated. When the NAS head 101A is a virtual computer, it can be deleted or created during operation of the NAS system 7A.

When the NAS head 101A receives ARP requests from the access source system 3A, 3B, or 3C, and returns ARP responses to the ARP requests, a read request can be received from the access source system being the destination of the returned ARP response. The NAS head 101A can add the ID of the source of the read request (the access source system) to the access source list 82A as an OK access source ID.

Furthermore, the NAS head 101A evaluates, for example, whether or not its own load exceeds the first size with the prescribed timing (for example, when an ARP request is received, periodically, or at irregular intervals). Here, a variety items can be employed as 'load', however, in practice, for example, CPU usage, the amount of data sent from the NAS head 101A per unit time in accordance with the read request, the total amount of data sent from the NAS head 101A in a certain time band (for example, including the current time), or the number of access source systems currently connected to the NAS head 101A (for example, the number of access source systems in which a minimum fixed amount of data is transferred at fixed intervals), can be used.

When the NAS head 101A determines that its own load is equal to or less than the first size, the read request may be accepted from any of the access source systems 3A, 3B, 3C, . . . (in practice, for example, an ARP response may be returned for an ARP request) However, when its own load is determined as exceeding the first size, for example, the NAS head 101A accepts read requests only from a prescribed or desired access source system (for example, the currently connected access source system), and read requests from other access source systems are not accepted (for example, an ARP response is not returned despite an ARP request being received).

Furthermore, the NAS head 101A can increase the number of NAS heads accepting read requests (hereafter referred to as 'accept-enabled NAS heads') with prescribed or desired timing (for example, when it is determined that its own load exceeds the first size). A method of increasing the number of accept-enabled NAS heads in which, for example, the NAS head 101A selects one (or many) NAS head ID from the NAS head list 84A, and issues the prescribed request to a NAS head having the selected NAS head ID, thus enabling the NAS head for acceptance, can be employed. Furthermore, for example, a different method in which the NAS head 101A creates a new virtual computer in the NAS system 7A or 7B, and the prescribed setup is conducted for the virtual computer, thus employing the virtual computer as an accept-enabled NAS head 101A, can also be employed. If, for example, the NAS head receiving the prescribed request cannot increase the number of its own access source systems (for example, if its own load is greater than the prescribed size), a notification indicating that addition is not possible may be sent to the NAS head 101A. In this case, the NAS head 101A may attempt to set another NAS head as an accept-enabled NAS head.

When increasing the number of accept-enabled NAS heads (or when its own load is determined as exceeding the first size), the NAS head 101A does not accept read requests (for example, an ARP response is not returned despite receipt of an ARP request) from access source systems having an OK access source ID recorded in the access source list 82A (for example, access source systems being the return destination of the ARP response). Furthermore, the NAS head 101A conveys at least OK access source IDs of one or more access source IDs recorded in the access source list 82A to an accept-enabled NAS head (for example, 101B) (in this case, the NAS head 101B may be notified of the IP address of the NAS head 101A). The NAS head receiving the OK access source ID (for example, 101B) records the OK access source ID in the access source list (for example, 82B) as an NG access source ID for itself. Thus, for example, when an ARP request is subsequently issued from an access source system having an OK access source ID for the NAS head 111A, the NAS head 101A returns an ARP response, however, since the ID of the access source system is an NG access source ID to the added NAS head, an ARP response is not returned from the added NAS head.

When the NAS head 101A increases the number of accept-enabled NAS heads, the file sharing function is started, and thus the data able to be read by the NAS head 101A can also be read by the added NAS head despite the added NAS head receiving a read request. In other words, data enabled for read by the access source system connected to the NAS head 101A can also be set to be enabled for read for another access source system connected to the added NAS head.

When the NAS head 101A increases the number of accept-enabled NAS heads, data in the data storage area 202A can be copied to another data storage area (for example, 202B) as necessary. Here, when copying of data is necessary, it is possible, for example, that the added NAS head is in another NAS system 7B. On the other hand, when copying of data is unnecessary, for example, is possible that the added NAS head is in the same NAS system 7A, and that the data storage area 202A is shared between the NAS head 101A and the added NAS head.

Furthermore, the NAS head 101A can change from accept-enabled to accept-disabled. For example, the NAS head 101A evaluates whether or not its own load is less than the aforementioned first size and less than the second size. If less (for example, when a condition occurs in which it does not receive a read request for a fixed period) it can be changed to accept-disabled. When accept-disabled, for example, the NAS head 101A can stop the file sharing function. Furthermore, in this case, the NAS head 101A searches for the accept-enabled NAS head (for example, it broadcasts the prescribed inquiry to the second LAN 4), and requests the found NAS head not to set the OK access source ID for the NAS head 101A as an NG access source ID for that NAS head. When the NAS head receiving the request (for example, 101B) records the OK access source ID for the NAS head 101A as an NG access source ID in the access source list (for example, 82B) it references, that NG access source ID is deleted. Thus, that NAS head can then receive a read request from the access source system having the OK access source ID for the NAS head 101A in place of NAS head 101A (for example, an ARP response can be returned when an ARP request is received).

An example of the processing conducted by this system is described below. The following description assumes that the NAS head 101A in the NAS system 7A is in the fully accept-enabled state (a read request can be accepted from any access source system), and the NAS head NAS head 101B is in the fully accept-disabled state (a read request is not accepted from any access source system).

The access source system 3A broadcasts the ARP request including the IP address of the NAS head 101A to the first LAN 2. Thus, all nodes connected to the first LAN 2 receive the ARP request, and each node returns an ARP response including its own MAC address if its own IP address is included in the ARP request.

The NAS head 101A therefore responds to the ARP request and returns an ARP response including its own MAC address to the access source system 3A. Thus, the access source system 3A can know the MAC address, in addition to the IP address, of the NAS head 101A, and can subsequently specify the MAC address and issue a read request. When, for example, the NAS head 101A subsequently receives a read request from the access source system 3A, the access source ID (for example, IP address and/or MAC address) of the access source system 3A of the read request is added to the access source list 82A.

The same processing is conducted even when the access source system 3B broadcasts an ARP request including the IP address of the NAS head 101A to the first LAN 2. In other words, an ARP response including the MAC address of the NAS head 101A is returned to the access source system 3B. Thus, when communication is conducted between the access source system 3B and the NAS head 101A, the access source ID of the access source system 3B is added to the access source list 82A.

It is assumed that subsequently, the NAS head 101A evaluates whether or not the NAS head 101A load exceeds the first size, and determines that the load exceeds the first size. In this case, the NAS head 101A sets the access source ID (the ID of the access source system 3A or 3B in this case) recorded in the access source list 82A to an OK access source ID, and sets all others to NG access source IDs. In other words, read requests from access source systems other than those having IDs set as OK access source IDs are not accepted.

Furthermore, when the NAS head 101A does not accept read requests from access source systems other than those having OK access source IDs, processing is conducted to increase the number of accept-enabled NAS heads. In practice, for example, NAS head 101A selects one (or many) NAS head ID from the NAS head list 84B. It is assumed that the NAS head having the NAS head ID selected here (for example, the IP address and/or MAC address) is the NAS head 101B. In this case, the NAS head 101A notifies the OK access source ID written in the access source list 82A to the NAS head 101B (this notification may also include the IP address of the NAS head 101A). The NAS head 101B records the notified OK access source IDs (the IDs of the access source systems 3A and 3B in the afore-mentioned example) in the access source list 82B as NG access source IDs. Thus, the NAS head 101B is accept-disabled from access source systems 3A and 3B, however it is accept-enabled from other access source systems. In practice, for example, when an ARP request is broadcast from the access source system 3C, since only the IDs of the access source systems 3A and 3B are recorded in the access source list 82A as OK access source IDs, the NAS head 101A does not return an ARP response to the ARP request from the access source system 3C. However, since the IDs of the access source systems 3A and 3B are simply recorded as NG access source IDs in the access source list 82B, the NAS head 101B returns an ARP response including the MAC address of the NAS head 101B for the ARP request from the access source system 3C. Thus, since the access source system 3C issues a read request based on the MAC address of the NAS head 101B, the read request is sent to the NAS head 101B.

Furthermore, the NAS head 101A copies data stored in the data storage area 202A (data able to be read by the access source systems 3A and 3B) to the data storage area 202B in the NAS system 7B. Furthermore, by, for example, starting the file sharing function in the NAS head 101B, the NAS head 101A ensures that the data following copying is shared data (in other words, data able to be read by a plurality of access source systems).

Subsequently, the NAS head 101A conducts an evaluation to determine whether or not its own load is less than the second load. Here, when its own load is determined to be less than the second load, the NAS head 101A conducts processing to ensure that it is in the fully accept-disabled state. In practice, for example, the NAS head 101A can stop the file sharing function. Furthermore, in this case, the NAS head 101A can search for accept-enabled NAS heads (for example, select one NAS head ID from the NAS head list 84A). Here, the found NAS head is assumed to be the NAS head 101B. The NAS head 101A requests that the OK access source ID for itself not be set as an NG access source ID for the NAS head 101B. When the OK access source ID for the NAS head 101A (the ID for access source systems 3A and 3B) is recorded as an NG access source ID in the access source list 82B referenced by itself, the NAS head 101B having received this request deletes the NG access source ID from the access source list 82B. Thus, the NAS head 101B accepts read requests from access source systems 3A and 3B in place of the NAS head 101A.

The above description is an example of the processing flow conducted in the system according to the present embodiment. In this processing flow, at least one of the data storage area 202A and the data storage area 202B may be a cache memory or a logical volume as described above. Thus, data can be copied from cache memory to cache memory or logical volume, and from logical volume to cache memory or logical volume.

The system according to the present embodiment is described in detail below.

FIG. 2 shows an outline of the software configuration of the system according to one embodiment of the present invention. In FIG. 2, the access source system 3A and NAS system 7A are shown as representative components, however, the configuration of 3A and 7A in each system can be applied to other access source systems 3B, 3C, . . . and another NAS system 7B.

The access source system 3A has an application program (hereafter referred to as the 'access source AP') 305, an operating system (hereafter referred to as the 'access source OS') 307, and an NAS head list referenced by the access source OS 307 (hereafter referred to as the 'OS referenced NAS head list') 306.

The access source AP 305 is a computer program running on the access source OS 307. The access source AP 305 manages, for example, the NAS head list it references (hereafter referred to as 'AP managed NAS head list 308'). One (or many) NAS head IP address is recorded in the AP managed NAS head list 308 as shown in FIG. 3A. The access source AP 305 references the AP managed NAS head list 308, and can issue a read request specifying one IP address from the list 308 to the access source OS 307.

The access source OS 307 manages the IP address of its own access source system 3A (hereafter referred to as the 'access source IP address'), and the MAC address (hereafter referred to as the 'access source MAC address'). The access source OS 307 can create an ARP request including an IP address specified from the access source AP 305, add the access source IP address to the ARP request, and broadcast the ARP request. Furthermore, when the ARP response for the ARP request is received, the access source OS 307 adds the IP address included in the ARP request, and the MAC address included in the ARP response, to the OS referenced NAS head list 306. Thus, as shown in FIG. 3B, one (or many) combination of the IP address and the MAC address is described in the OS referenced NAS head list 306. Furthermore, when a read request in which an IP address is specified is received from the access source AP 305, the access source OS 307 can reference the OS referenced NAS head list 306, and thus identify the MAC address for the IP address, and issue a read request specifying the identified MAC address as the access destination. Furthermore, in this case, the access source IP address and the access source MAC address can be added to the read request.

The ARP response control table 31, the currently accessed access source list 11, the cumulative access source list 33, and the alternate candidate NAS head list 13 are stored in the NAS system 7A storage resource in NAS system 7A. At least one of this information 31, 11, 33, and 13 may be prepared in each of the one or more NAS heads in the NAS system 7A, and may be shared with the one or more NAS heads. In this embodiment, the ARP response control table 31 and the currently accessed access source list 11 are prepared for each NAS head, and the cumulative access source list 33 and alternate candidate NAS head list 13 are set as data which may be shared by a plurality of NAS heads.

The ARP response control table 31 is a table in which information to controlling who ARP responses may be returned to, and not returned to, is recorded. In practice, for example, the first ARP response control table 31A as shown in FIG. 3C, and the second ARP response control table 31B as shown in FIG. 3D, are possible. One or more access source IP addresses for which an ARP response may be returned (in other words, the OK access source ID), and information to the effect that an ARP response must not be returned to an access source system having an IP address other than these one or more OK access source IP addresses, is recorded in the first ARP response control table 31A. One or more access source IP addresses for which an ARP response must not be returned (in other words, the NG access source ID), and information to the effect that an ARP response may be returned to an access source system having an IP address other than these one or more NG access source IP addresses, is recorded in the second ARP response control table 31B. At least one of the first ARP response control tables 31A and 31B may be provided, and these may be selectively employed by the NAS head OS 29 described below, and a table combining the first ARP response control tables 31A and 31B (for example, a table in which the status 'response-enabled' or 'response-disabled' is written for each access source IP address) may be prepared. Furthermore, a destination interface ID corresponding to an access source IP address may be recorded in at least one of the ARP response control tables 31A and 31B. The destination interface ID can be the ID of a communications port mounted in the NAS head. Thus, when a communications port mounted in the NAS head is mounted, for example, the NAS head OS 29 can identify through which of the plurality of communications ports the ARP response may be output.

As shown in FIG. 4A, an access-enabled access source system IP address (and/or MAC address) is recorded in the NAS head having the list 11 in the currently accessed access source list 11. Furthermore, the amount of sent data and/or the amount of data sent per unit time are recorded in the currently accessed access source list 11 for each access source IP address. The amount of sent data represents the total amount of data sent to the access source system. The amount of data sent per unit time represents the amount of data sent to the access source system per unit time. The amount of data sent per unit time is, for example, computed periodically, or at irregular intervals, for each access source IP address with the NAS head OS 29, and written to the currently accessed access source list 11 with the file sharing program 27 able to be linked to the NAS head OS 29. Furthermore, for example, for a given access source system, when the amount of data sent per unit time is detected as continuing for the prescribed time at equal to or less than the prescribed amount by the prescribed program (for example, the access monitoring program 19), the record for this access source system (for example, the access source IP address and the like) may be deleted from the currently accessed access source list 11.

As shown in FIG. 4B, all access source IP addresses (and/or MAC addresses) in the access source system enabled for access to the NAS system 7A are recorded in the cumulative access source list 33. In practice, for example, all IP addresses recorded in the currently accessed access source list in the NAS system 7A are recorded in the cumulative access source list 33. The access source IP addresses recorded in the cumulative access source list 33 are not limited to IP addresses in the access source system of the NAS system 7A, bit may also include IP addresses in the access source system of the other NAS system 7B. In other words, all IP addresses in all access source systems for which access is permitted to the NAS systems 7A and 7B can be recorded in the cumulative access source list 33. This, may be implemented, for example, by passing the currently accessed access source list 11 from the NAS head of the NAS system 7B to the NAS head of the NAS system 7A, and writing all access source IP addresses written in the currently accessed access source list in the cumulative access source list 33.

As shown in FIG. 4C, the IP addresses (and/or MAC addresses) of the NAS heads for which the accept-disabled access source systems can be increased is recorded in the alternate candidate NAS head list 13. The NAS head 101A, for example, issues an alternate-possible/not-possible inquiry to the NAS head having the IP address written in the alternate candidate NAS head list 13, and by receiving a response from the NAS head indicated whether or not an alternate is possible, it can be determined whether or not the subject of the inquiry is an alternate-possible NAS head. The alternate-possible NAS head is an NAS head for which the access source systems can be increased. In practice, for example, when the NAS head logically increases in addition to the NAS head 101A, an alternate-possible NAS head is an NAS head able to accept read requests from a new access source system (for example, an access source system having an IP address not recorded in the cumulative access source list 33) in place of the NAS head 101A. Furthermore, when the NAS head 101A is logically eliminated, an alternate-possible NAS head is an NAS head able to accept read requests from an access source system accepted in the NAS head 101A (or a new access source system). Logical increase and deletion (or elimination) of NAS heads does not imply physical addition or removal of NAS heads as hardware, rather, it implies increase or decrease of hardware resources of the NAS systems 7A and 7B. In practice, a logical increase in the number of NAS heads allows, for example, an NAS head being a circuit board to start anew and accept read requests, or an NAS head being a virtual computer to be created dynamically. On the other hand, a logical decrease (or elimination) in the number of NAS heads ensures that, for example, an NAS head being a circuit board is blocked and does not receive read requests, or an NAS head being a virtual computer is deleted dynamically (or is eliminated).

The NAS head 101A has an operating system (hereafter referred to as the 'NAS head OS') 29, a file sharing program 27, and a load balance control program group 22. The load balance control program group 22 is a program group controlling the load balance of the NAS heads, and includes, for example, an access monitoring program 19, an ARP response control program 21, a mirror creation request acceptance processing program 23, and a mirror deletion processing program 25.

When the NAS head OS 29 holds the ARP response control table 31 and receives the ARP request, control of whether or not the ARP response is returned is based on the access source IP address of the ARP request source and the information recorded in the ARP response control table 31. Furthermore, when a read request from the ARP response destination is received, the NAS head OS 29 passes the access source IP address of the source of the read request to the file sharing program 27.

The file sharing program 27 adds the passed access source IP address to the currently accessed access source list 11.

The access monitoring program 19 references the currently accessed access source list 11 and references and updates the cumulative access source list 33 as necessary. Furthermore, the access monitoring program 19 can issue a mirror creation request to the mirror creation request acceptance processing program of another NAS head via the NAS head OS 29 in response to the information in the currently accessed access source list 11.

The mirror creation request acceptance processing program 23 accepts a mirror creation request from another NAS head. When a mirror creation request is accepted, the mirror creation request acceptance processing program 23 can request a response to the ARP request from the access source system having an access source IP address not recorded in the cumulative access source list 33.

The mirror deletion processing program 25 executes processing to change the status of the NAS head 101A from accept-enabled to accept-disabled. In practice, for example, the mirror deletion processing program 25 can delete information from the cumulative access source list 33, delete data enabled for read from the data storage area, and request stopping of the file sharing program 27 and the ARP response control program 19.

Processing conducted in the system according to the present embodiment is described in detail below.

Figure 5:
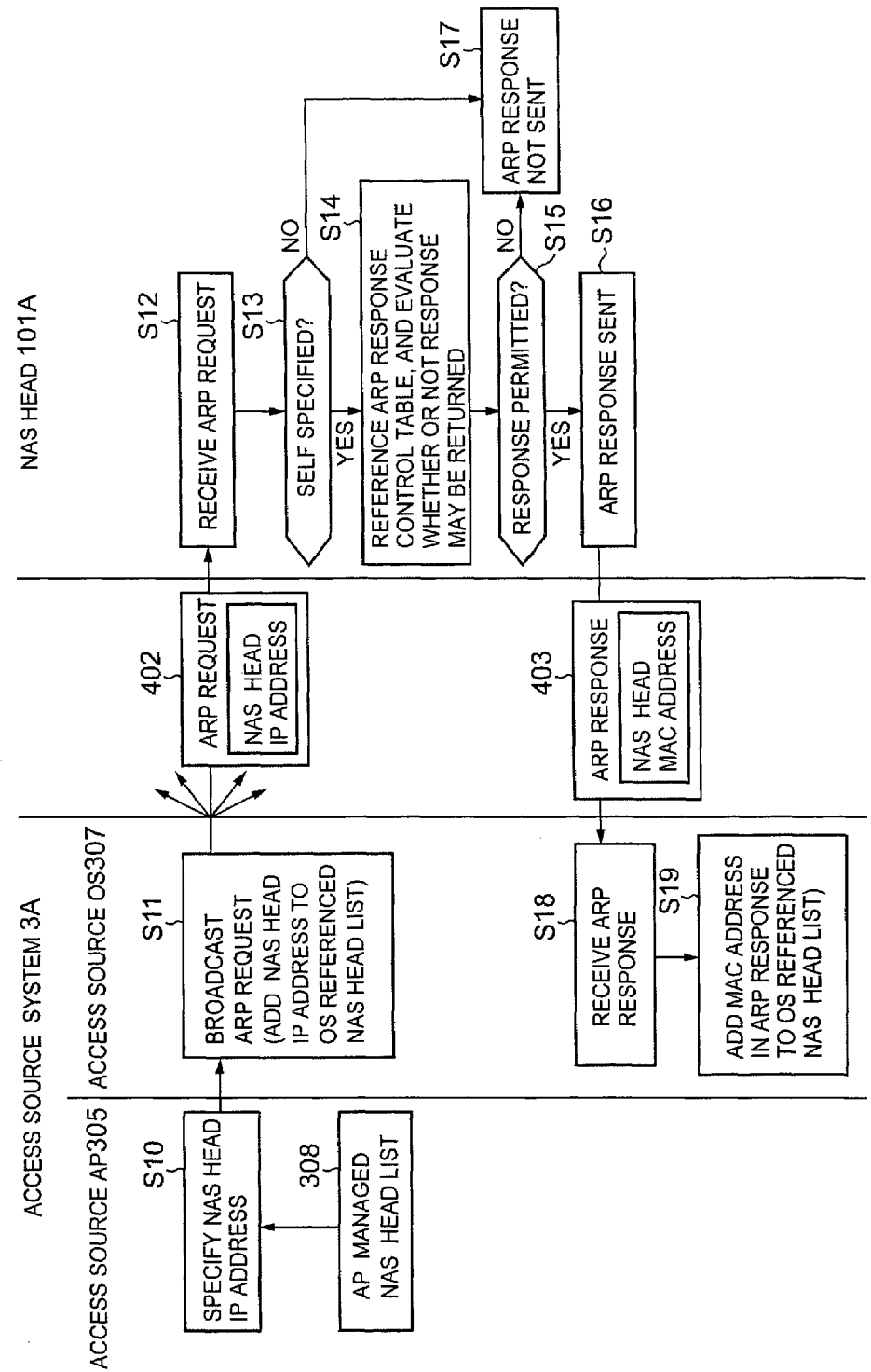
FIG. 5 shows an example of processing flow from issue of an ARP request to return of an ARP response.

FIG. 5 shows an example of processing flow from issue of an ARP request to return of an ARP response.

In the access source system 3A, the access source AP 305 references the AP managed NAS head list 308 to specify the IP address of the NAS head to be set as the destination of the MAC address inquiry in the access source OS 307 (step S10).

The access source OS 307 creates an ARP request 402 including the specified NAS head IP address, and broadcasts the ARP request 402 to the first LAN2 (step S11). In this case, the access source OS 307 can add the NAS head IP address included in the ARP request 402 to the OS referenced NAS head list 306.

The NAS head OS 29 of the NAS head 101A receives the ARP request 402 (S12). The NAS head OS 29 evaluates whether or not it is specified in the ARP request 402, in practice, for example, it evaluates to determine whether or not the NAS head IP address included in the ARP request 402 is compatible with the NAS head IP address it manages (S13).

In S13, when it is determined that it is not specified (NO in S13), the NAS head OS 29 does not send the ARP request (S17).

On the other hand, in S13, when it is determined that it is specified (YES in S13), the NAS head OS 29 references the ARP response control table 31, and evaluates whether or not the ARP response may be returned (S14). In practice, for example, the NAS head OS 29 evaluates whether or not the access source IP address of the source of the ARP request 402 is the OK access source ID (and/or the NG access source ID) in the ARP response control table 31.

In S14, if it is determined that a response must not be returned (in other words, when it is determined that the access source IP address of the source is not a OK access source ID, and/or is the NG access source ID) (NO in S15), the NAS head OS 29 does not send the ARP request (S17).

However, in S14, when it is determined that a response may be sent, (in other words, when it is determined that the access source IP address of the source is the OK access source ID, and/or is not a NG access source ID) (YES in S15), the NAS head OS 29 creates an ARP response 403 including the NAS head MAC address it manages, and the ARP response 403 is sent (S16).

The access source OS 307 receives the ARP response 403 (S18). The access source OS 307 matches the NAS head MAC address included in the ARP response 403 to the NAS head IP address registered in the OS referenced NAS head list 306 in S11 (S19).

When the access source AP 305 subsequently issues a read request having the same IP address as the NAS head IP address specified in S10 with the afore-mentioned processing, the access source OS 307 issues a read request specifying the NAS head MAC address identified from the OS referenced NAS head list 306 by the NAS head MAC address corresponding to the IP address. When the read request is received by the NAS head (or when the ARP response is returned), the read request source (or the ARP response destination) access source IP address may be recorded in the currently accessed access source list 11.

Depending upon the specifications of the access source OS access source OS 307, the MAC address (and IP address) recorded in the OS referenced NAS head list 306 may be deleted after a fixed time (for example, ten minutes) has elapsed after the MAC address is added. In this case, for example, after a MAC address is deleted, when a read request specifying the NAS head IP address corresponding to the deleted MAC address is received, since the MAC address corresponding to the NAS head IP address is not found from the OS referenced NAS head list 306, the access source OS 307 may issue an ARP request including the NAS head IP address again, thus resolving the address (in other words, acquiring the MAC address corresponding to the IP address). In some cases, since the destination NAS head of the ARP response received for the ARP request may differ from the previous destination NAS head, the MAC address included in the ARP response may differ from the previous MAC address.

Figure 6:
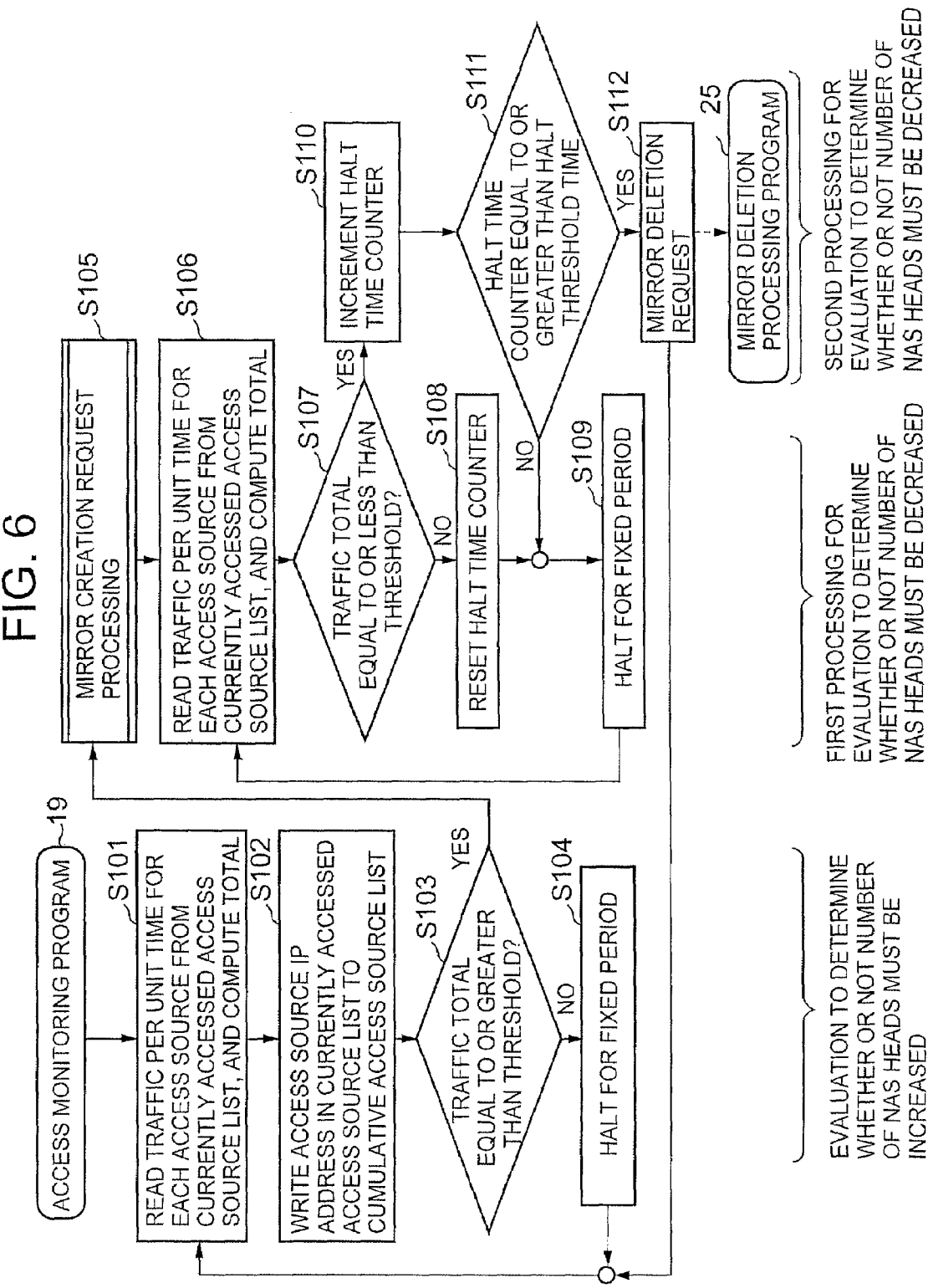
FIG. 6 shows an example of processing flow with the access monitoring program 19.

FIG. 6 shows an example of processing flow with the access monitoring program 19.

The access monitoring program 19 can start execution of the processing shown in FIG. 6 periodically, or at irregular intervals.

The access monitoring program 19 references the currently accessed access source list 11, acquires the amount of data sent per unit time (in other words, the traffic volume) for each access source system (in other words, the IP address), and computes a total for the amount of data sent (hereafter referred to as the 'traffic total') (S101).

The access monitoring program 19 writes all access source IP addresses in the currently accessed access source list 11 to the cumulative access source list 33 (S102).

The access monitoring program 19 determines whether or not the traffic total computed in S101 is equal to or greater than the prescribed threshold, and if a negative evaluation is not obtained (N in S103), processing is halted for a fixed period (S104), and processing in S101 is then executed again.

However, if the result of the evaluation is affirmative (Y in S103), the access monitoring program 19 executes the mirror creation request processing described below (S105). The access monitoring program 19 then conducts the same processing as in S101 (S106), and an evaluation is conducted to determine whether or not the computed traffic total is equal to or less than the lower threshold (S107).

If the result of the evaluation in S107 is negative (N in S107), the access monitoring program 19 resets the halt time counter and executes the processing in S106 again after a prescribed time (S109). Here, the halt time counter determines the time for which the load on the NAS head 101A has continued at less than the afore-mentioned second size.

Figure 8A:
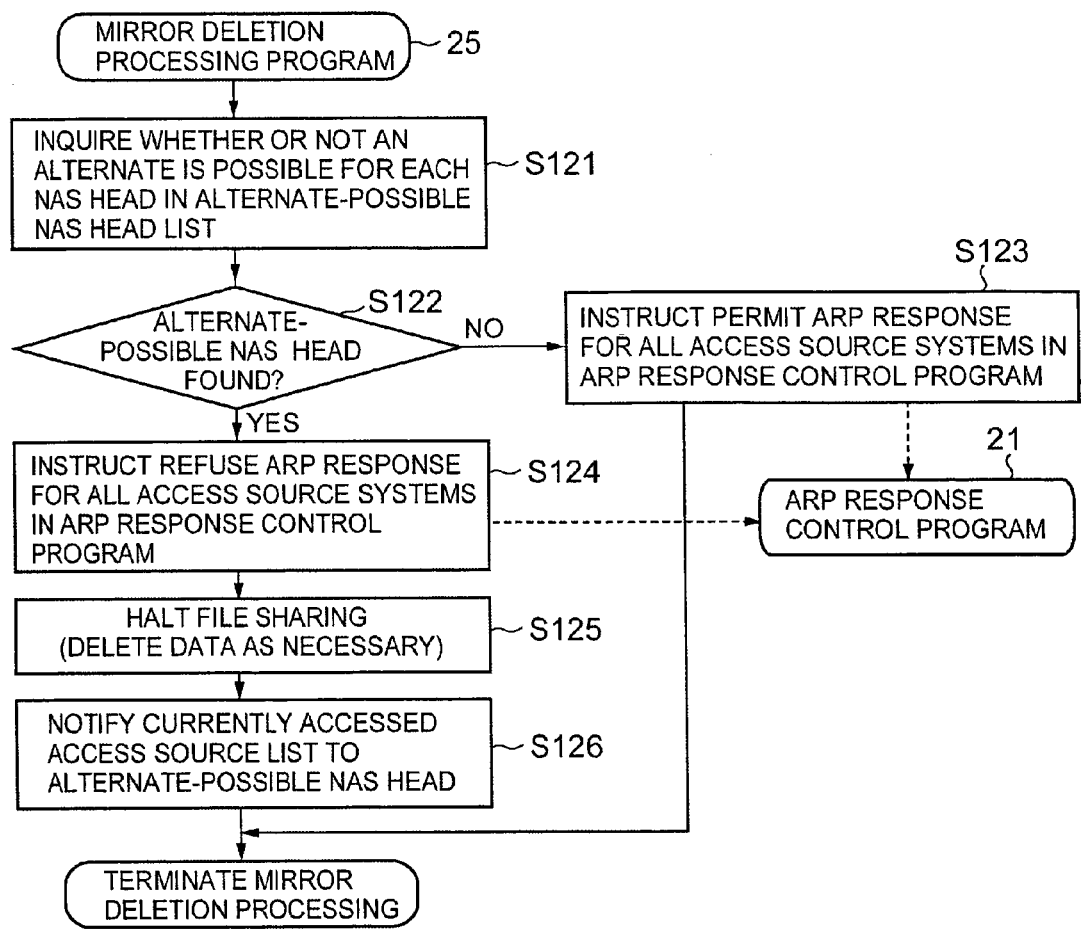
FIG. 8A shows an example of processing flow with the mirror deletion processing program 25.

If the result of the evaluation in S107 is affirmative (Y in S107), the access monitoring program 19 increments the halt time counter (S110) and evaluates the value shown by the halt time counter to determine whether or not it is equal to or greater than the halt threshold (S111). Thus, if the result of the evaluation is negative (N in S111) the access monitoring program 19 conducts the operation in S109, and if the result of the evaluation is positive (Y in 111), a mirror deletion request is issued to the mirror deletion processing program 25 (S112). Thus, the processing shown in FIG. 8A is conducted by the mirror deletion processing program 25.

Figure 7A:
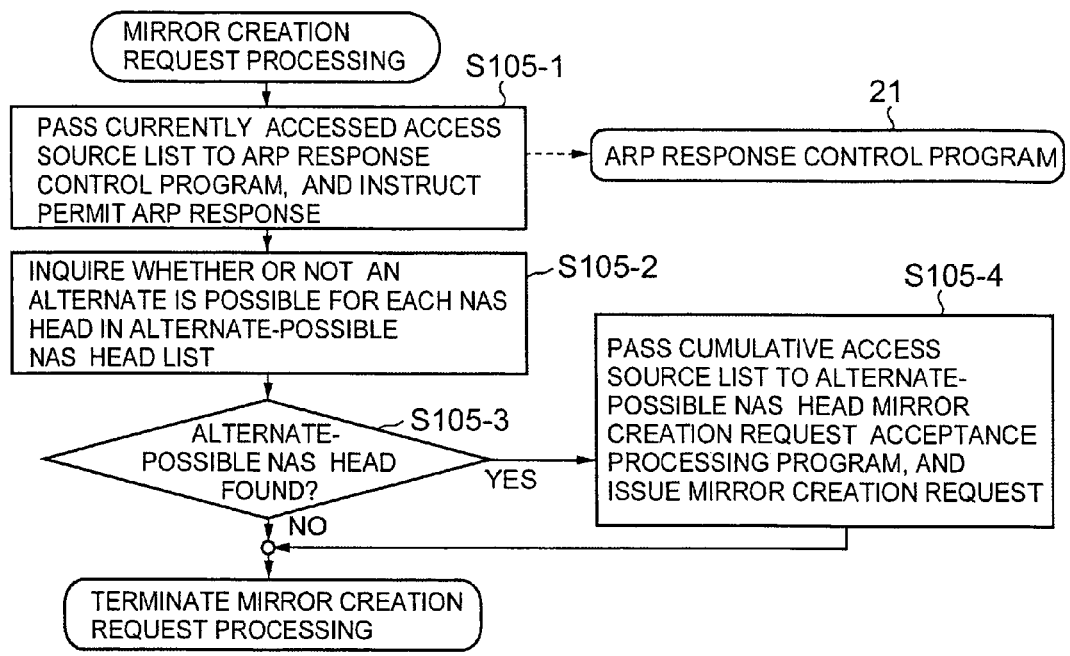
FIG. 7A shows an example of processing flow for the mirror creation request in S105 in FIG. 6.

FIG. 7A shows an example of mirror creation request processing in S105 in FIG. 6.

Figure 8B:
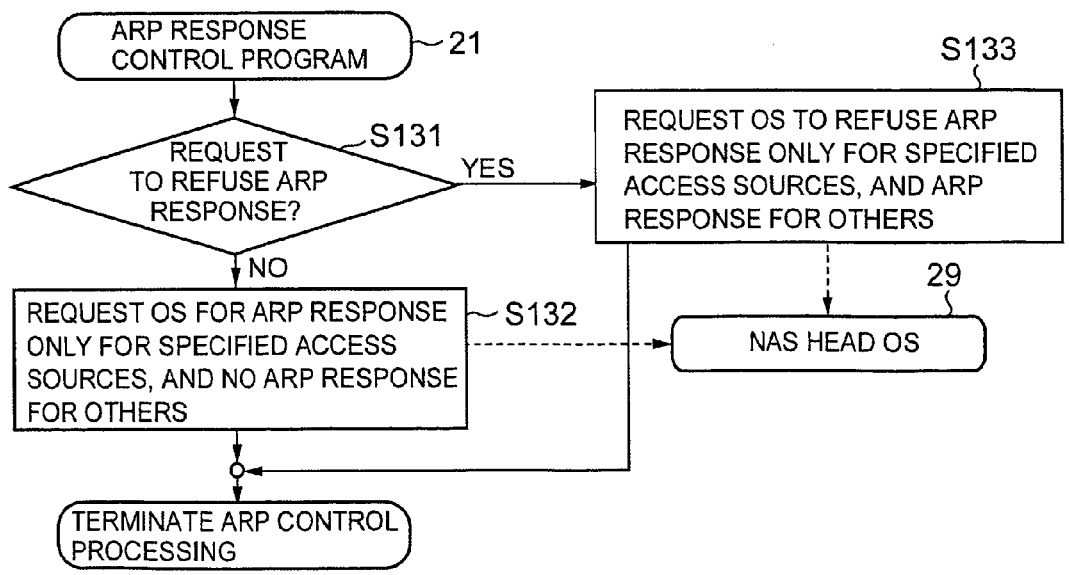
FIG. 8B shows an example of processing flow with the ARP response control program 21.

The access monitoring program 19 passes the currently accessed access source list 11 to the ARP response control program 21, and specifies that an ARP response is permitted (S105-1). Thus, the processing shown in FIG. 8B is conducted by the ARP response control program 21.

The access monitoring program 19 references the alternate candidate NAS head list 13, and inquires whether or not an alternate is possible for the NAS heads having IP addresses recorded in the alternate candidate NAS head list 13 (S105-2) The NAS head receiving the inquiry employs, for example, the access monitoring program to compute the traffic total with the processing conducted in S102, and if the traffic total is equal to or less than the alternate-possible threshold, a response can be returned to the effect that an alternate is possible.

When an alternate-possible NAS head is found by receiving such a response (Y in S105-3) and the like, the access monitoring program 19 passes the cumulative access source list 33 in the NAS system 7A to the mirror creation request acceptance processing program of the alternate-possible NAS head, and issues a mirror creation request (S105-4).

Following S105-4, or when an alternate-possible NAS head is found (N in S105-3), mirror creation request acceptance processing is terminated.

Figure 7B:
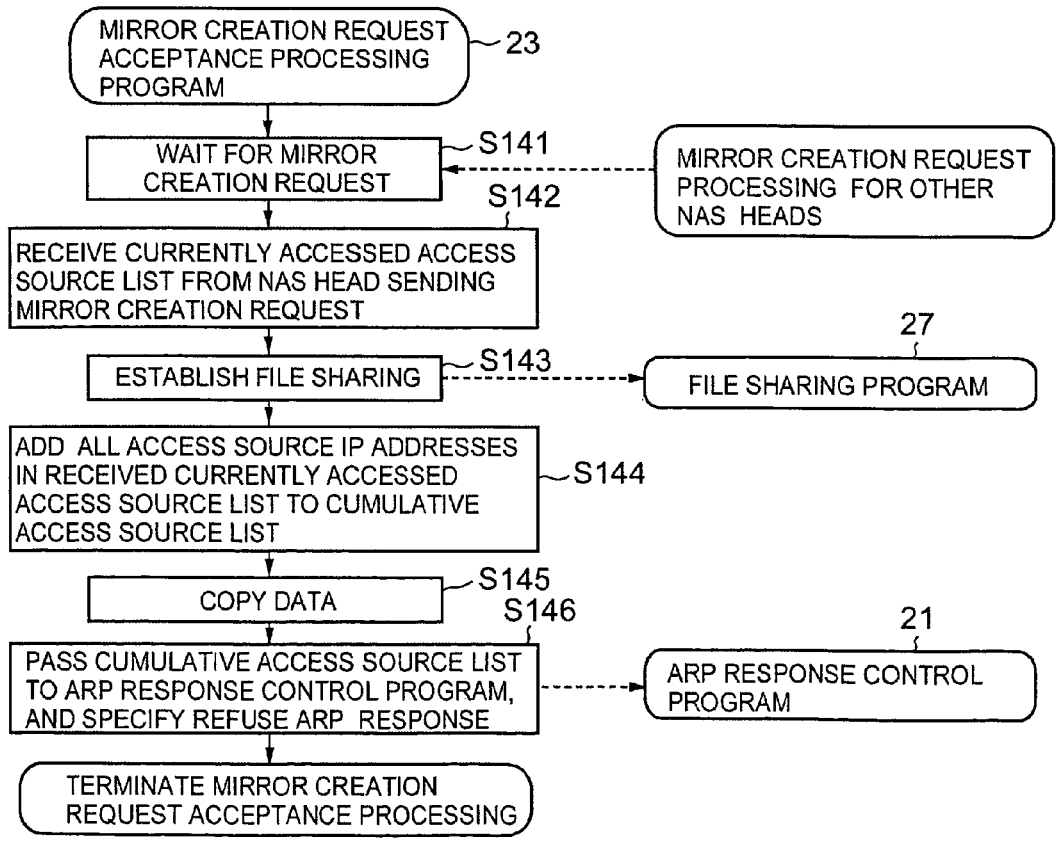
FIG. 7B shows an example of processing flow with the mirror creation request acceptance processing program 23.

FIG. 7B shows an example of processing flow with the mirror creation request acceptance processing program 23.

When the mirror creation request acceptance processing program 23 receives a mirror creation request while waiting for a mirror creation request (S141), the currently accessed access source list is received from the NAS head being the source of the mirror creation request (S142). The mirror creation request acceptance processing program 23 requests the file sharing program 27 to establish file sharing (S143). The file sharing program 27 conducts processing to establish file sharing in response to the request. Thus, for example, it is possible to share files with a plurality of new access source systems not connected to another NAS head.

The mirror creation request acceptance processing program 23 adds all access source IP addresses in the currently accessed access source list received in S142 to the cumulative access source list 33 (S144).

Furthermore, the mirror creation request acceptance processing program 23 copies data as necessary (S145). Here, for example, data is received from the NAS head being the source of the mirror creation request, and this data may be written to the prescribed data storage area. Conversely, the NAS head being the source of the mirror creation request may be requested for data, and the data received in response to the request written to the prescribed data storage area.

The mirror creation request acceptance processing program 23 passes the cumulative access source list 33 to the ARP response control program 21, and instructs refusal of the ARP response (S146). Thus, the processing shown in FIG. 8B is conducted by the ARP response control program 21.

All access source systems receiving read requests for the NAS head being the source of the mirror creation request become access source systems refusing acceptance by the NAS head 101A with the processing shown in FIG. 7B, and new access source systems other than these access source systems then accept read requests with the NAS head 101A.

FIG. 8A shows an example of processing flow with the mirror deletion processing program 25.

The mirror deletion processing program 25, for example, responds to mirror deletion requests from the access monitoring program 19 and commences processing.

The mirror deletion processing program 25 references the alternate candidate NAS head list 13, and inquires whether or not an alternate is possible for the NAS heads having IP addresses recorded in the alternate candidate NAS head list 13 (S121) The NAS head receiving the inquiry employs, for example, the access monitoring program to compute the traffic total with the processing conducted in S102, and if the traffic total is equal to or less than the alternate-possible threshold, a response can be returned to the effect that an alternate is possible.

When an alternate-possible NAS head is found by receiving such a response (Y in S122) and the like, the mirror deletion processing program 25 instructs the ARP response control program 21 to refuse the ARP response for all access source systems (S124) The mirror deletion processing program 25 then requests the file sharing program 27 to stop file sharing (S125). In this case, the mirror deletion processing program 25 deletes data (for example, data which may be referenced only by an access source system accepted in an NAS head 101A which has been logically eliminated) as necessary. The mirror deletion processing program 25 passes the currently accessed access source list 11 to the alternate-possible NAS head (S126). Thus, in the alternate-possible NAS head, the IP addresses in the currently accessed access source list 11 are recorded in the ARP response control table in the alternate-possible NAS head as accept-enabled IP addresses (in other words, OK access source IDs). As a result, the ARP response for the access source system receiving ARP response from the NAS head 101A (hereafter referred to as the 'self access source system' for the purposes of convenience) is returned from the alternate-possible NAS head in place of the NAS head 101A.

When an alternate-possible NAS head is not found as a result of processing in S121 (N in S122), the mirror deletion processing program 25 instructs the ARP response control program 21 to permit ARP responses for all new access source systems not currently permitted to access any NAS head (S123). The fact that no alternate-possible NAS head is found is due to it being an NAS not accepting read requests from new access source systems other than itself (NAS head 101A).

FIG. 8B shows an example of processing flow with the ARP response control program 21.

When the ARP response control program 21 receives the refuse ARP response specification (Y in S131), ARP responses are refused only for access source systems having the specified access source IP address (for example, an IP address in the passed currently accessed access source list), and the NAS head OS 29 is requested to permit ARP responses for other access source systems (S133). On the other hand, when the ARP response control program 21 receives the permit ARP response specification (N in S131), the NAS head OS 29 is requested to permit ARP responses only for access source systems having the specified access source IP address, and to refuse ARP responses for other access source systems (S132).

When the NAS head OS 29 receives a request from the ARP response control program 21 in S133, the specified access source IP address can be deleted from the first ARP response control table 31A (see FIG. 3C), and/or the specified access source IP address can be described in the second ARP response control table 31B (see FIG. 3D). Furthermore, when the NAS head OS 29 receives a request from the ARP response control program 21 in S132, the specified access source IP address can be described in the first ARP response control table 31A, and/or the specified access source IP address can be deleted from the second ARP response control table 31B.

According to the afore-mentioned embodiment, when, for example, access requests (for example, read requests) from a plurality of access source systems are concentrated in the first NAS head, and an access source system issuing an access request is newly added, the first NAS head logically adds the second NAS head as an accept-enabled NAS head, the first NAS head does not respond to inquiries from the new access source system, and access requests from the new access source system are received by the second NAS head with a response from the added second NAS head. Thus, load balancing of NAS heads is possible without the use of load balancing devices and path switching devices.

According to the afore-mentioned embodiment, a given NAS head is logically eliminated when the load decreases, thus saving overall NAS system resources.

Furthermore, according to the afore-mentioned embodiment, the first NAS head logically adds the second NAS head as an accept-enabled NAS head, the IDs of access source systems in which it is accept-enabled are notified to the second NAS head, and ARP responses are not returned to other access source systems. On the other hand, the second NAS head does not return ARP responses to access source systems having the notified IDs, however, it does return ARP responses to other access source systems. Thus, ARP responses are not returned from a plurality of NAS heads to the same access source system. As shown in FIG. 9A through 9D, therefore, the NAS system side can present the same IP address to all access source systems (in other words, all appear to be one NAS).

Figure 9A:
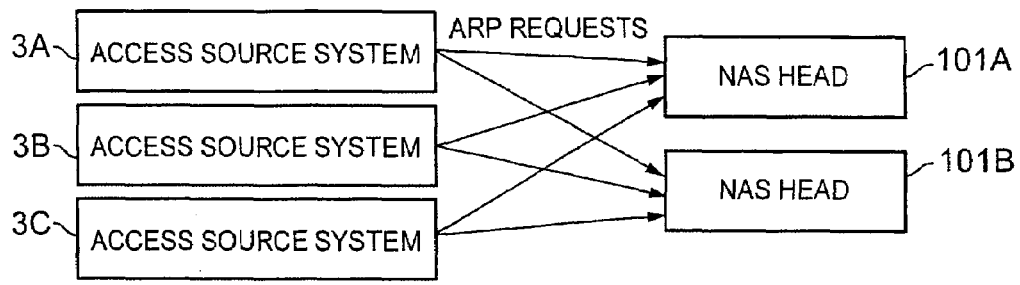
FIG. 9A shows the condition in which ARP requests are issued respectively from a plurality of access source systems 3A, 3B, and 3C.
Figure 9B:
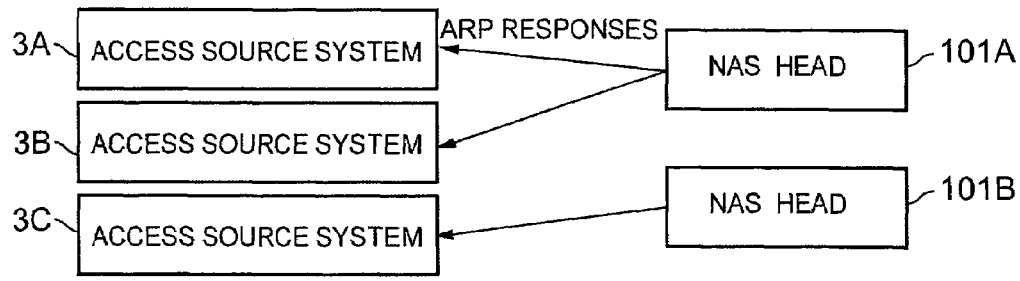
FIG. 9B shows the condition in which ARP responses are returned from NAS heads 101A and 101B accepting ARP requests in FIG. 9A.

In other words, as shown in FIG. 9A, for example, when the access source systems 3A, 3B, and 3C broadcast an ARP request including the same IP address (for example, the IP address of the NAS head 101A), as shown in FIG. 9B, and by the afore-mentioned mechanism, an ARP response including the MAC address of the NAS head 101A is returned to the access source systems 3A and 3B, and an ARP response including the MAC address of the NAS head 101B is returned to the access source system 3C.

Figure 9C:
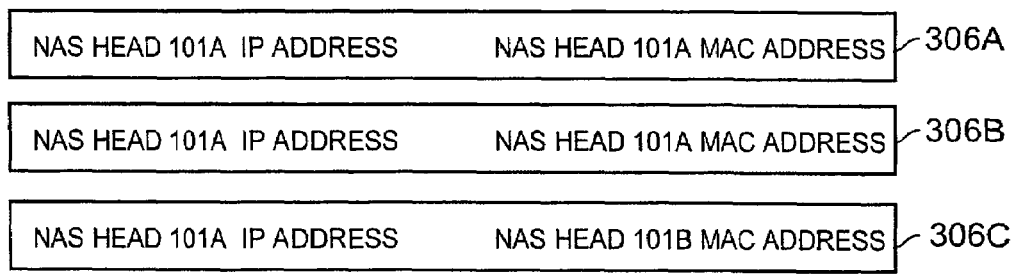
FIG. 9C shows the condition of the OS referenced NAS heads 306A, 306B, and 306C updated with the ARP response in FIG. 9B.

Thus, as shown in FIG. 9C, the IP address of the NAS head 101A and the MAC address of the NAS head 101A correspond in the OS referenced NAS head list 306A of the access source system 3A. Similarly, the IP address of the NAS head 101A and the MAC address of the NAS head 101A also correspond in the OS referenced NAS head list 306B of the access source system 3B. However, the MAC address of the NAS head 101B corresponds to the IP address of the NAS head 101A in the OS referenced NAS head list 306C of the access source system 3C.

Figure 9D:
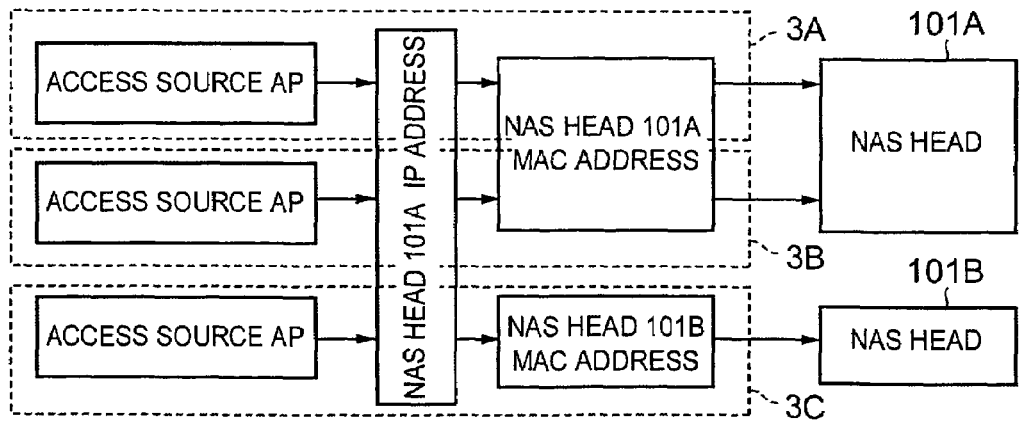
FIG. 9D shows the condition in which an access request is issued to each NAS head despite the same IP address being specified with the OS referenced NAS heads 306A, 306B, and 306C shown in FIG. 9C.

As a result, as shown in FIG. 9D, when an access request specifying the IP address of the NAS head 101A is issued by the access source systems 3A and 3B, the MAC address of the NAS head 101A is issued by the access source systems 3A and 3B based on the MAC address of the NAS head 101A corresponding to the IP address. However, in the access source system 3C, even when the access source AP issues an access request specifying the IP address of the NAS head 101A, an access request is issued by the access source OS to the NAS head 101B based on the MAC address of the NAS head 101B corresponding to the IP address.

As described above, even when the same NAS head IP address is assigned to a plurality of access source systems, the single NAS head returning ARP responses is controlled, and a different MAC address can therefore be presented, and the destination of each access request of a plurality of access source systems can be variously distributed.

Ideal embodiments of the present invention have been described above, however these embodiments are employed to illustrate the description of the present invention, and the scope of the present invention is not limited to these embodiments. The present invention may implement a variety of other configurations.

For example, if a logically added NAS head can be identified on a network such as the LAN 2 or 4 and the like, any configuration may be used. In practice, for example, each of a plurality of Blade servers in a Blade System may be a NAS head. Furthermore, a plurality of operating systems corresponding to a plurality of virtual computers may be started on a single computer, and a file sharing function executed on each operating system. Furthermore, a plurality of NAS heads may be combined in clusters, and NAS heads may be logically added or deleted for each cluster.

What is claimed is:

1. An information processing system, comprising:
a first controller and a second controller accepting requests from a plurality of sources, and writing and reading data to/from a storage device in response to these requests;
wherein the first controller returns a response to a request from at least one first source of the plurality of sources, to the first source, and does not return a response to a request from a second source other than the first source, to the second source; and
wherein the second controller does not return a response to a request from the first source to the first source receiving a response from the first controller, and returns a response to a request from the second source to the second source not receiving a response from the first controller,
wherein the first controller sends a succession request and first ID to identify the first source to the second controller, wherein the first controller also issues an inquiry to the second controller as to whether or not succession is possible, wherein the second controller issues a response to the first controller to the effect that succession is possible if the load on the second controller is equal to or less than a prescribed size, and wherein, when the first controller does not receive a response to the effect that the succession is possible, source IDs other than the first source ID are also set such that the response thereto is permitted, and thus the first controller returns a response also to requests from the sources other than the first source.

2. The information processing system according to claim 1, wherein:
the first controller has a first logical address and a first physical address;
the second controller has a second logical address and a second physical address;
the first logical address and the second logical address are the same logical address indicating the same value;
when receiving a request including the same logical address from the first source, the first controller returns a response including the first physical address to the first source; and
when receiving a request including the same logical address from the second source, the second controller returns a response including the second physical address to the second source.

3. The information processing system according to claim 2 wherein the request is an ARP request including an IP address, and the response is an ARP response including a MAC address.

4. The information processing system according to claim 1, wherein the first controller sends an addition request and a first source ID identifying the first source to the second controller, and the second controller receives the addition request and first source ID, responds to the addition request, and does not respond to the request from the first source by setting the first source ID such that the response thereto is refused.

5. The information processing system according to claim 4 wherein the second controller also sets source IDs other than the first source ID such that the response thereto is permitted, and thus returns a response to the request from the second source having a second source ID.

6. The information processing system according to claim 4 wherein the first controller evaluates whether or not the load on the first controller is equal to or greater than a first-size, and if the result of the evaluation is affirmative, sends the addition request to the second controller.

7. The information processing system according to claim 4 wherein the first controller issues an inquiry to the second controller as to whether or not addition is possible, the second controller issues a response to the first controller to the effect that addition is possible if the load on the second controller is equal to or less than a prescribed size, and when receiving a response from the second controller to the effect that addition is possible, the first controller issues the addition request to the second controller.

8. The information processing system according to claim 4 wherein at least one of the first controller and the second controller execute processing to enable data accessible by the first source via the first controller to be accessible by the second source via the second controller.

9. The information processing system according to claim 4 comprising:
  a plurality of controllers including the first controller but not including the second controller;
    wherein each of the plurality of controllers writes to the prescribed storage area the source ID to which the each controller can respond, and thus all source IDs to which the plurality of controllers can respond are recorded in the prescribed storage area;
    wherein the first controller sends all source IDs recorded in the prescribed storage area to the second controller; and
    wherein the second controller sets all received source IDs such that the response thereto is refused, and thus a response is not sent to any of the sources corresponding to the source IDs.

10. The information processing system according to claim 1 wherein, when receiving the succession request and the first source ID, the second controller responds to the succession request, and also returns a response to requests from the first source by setting the first source ID such that the response thereto is permitted.

11. The information processing system according to claim 10 wherein the succession request is issued when the first controller no longer responds to requests from any source.

12. The information processing system according to claim 10 wherein the first controller evaluates whether or not the load on the first controller is equal to or less than a second size, and sends the succession request to the second controller if the result of the evaluation is affirmative.

13. The information processing system according to claim 10 wherein and, when receiving a response from the second controller to the effect that succession is possible, the first controller issues the succession request to the second controller.

14. The information processing system, comprising:
  a first controller and a second controller accepting requests from a plurality of sources, and writing and reading data to/from a storage device in response to these requests;
  wherein the first controller returns a response to a request from at least one first source of the plurality of sources, to the first source, and does not return a response to a request from a second source other than the first source, to the second source; and
  wherein the second controller does not return a response to a request from the first source to the first source receiving a response from the first controller, and returns a response to a request from the second source to the second source not receiving a response from the first controller,
  wherein, the first controller sends a succession request and first ID to identify the first source to the second controller, and when receiving the succession request and the first source ID, the second controller responds to the succession request, and also returns a response to requests from the first source by setting the first source ID such that the response thereto is permitted,
  wherein the first controller issues an inquiry to the second controller as to whether or not succession is possible, the second controller issues a response to the first controller to the effect that succession is possible if the load on the second controller is equal to or less than the prescribed size, and when receiving a response from the second controller to the effect that succession is possible, the first controller issues the succession request to the second controller, and
  wherein, when the first controller does not receive a response to the effect that the succession is possible, source IDs other than the first source ID are also set such that the response thereto is permitted, and thus the first controller returns a response also to requests from the sources other than the first source.

15. The information processing system according to claim 10 wherein at least one of the first controller and second controller deletes first data when the first data accessible by the first source via the first controller, and second data accessible via the second controller, are the same.

16. An information processing method comprising the steps of:
  a first controller and a second controller receiving a plurality of requests respectively issued from a plurality of sources;
  the first controller returning a response to a request from at least one first source of a plurality of first sources, to the first source, and not returning a response to a request from a second source other than the first source, to the second source; and
  the second controller not returning a response to a request from the first source to the first source receiving a response from the first controller, and returning a response from the second source to the second source not receiving a response from the first controller,
  wherein the first controller sends a succession request and first ID to identify the first source to the second controller, wherein the first controller also issues an inquiry to the second controller as to whether or not succession is possible, wherein the second controller issues a response to the first controller to the effect that succession is possible if the load on the second controller is equal to or less than a prescribed size, and wherein, when the first controller does not receive a response to the effect that the succession is possible, source IDs other than the first source ID are also set such that the response thereto is permitted, and thus the first controller returns a response also to requests from the sources other than the first source.

* * * * *